March 6, 1962 F. J. KOCH 3,023,897
TESTING AND SORTING APPARATUS
Filed July 1, 1959 3 Sheets-Sheet 1
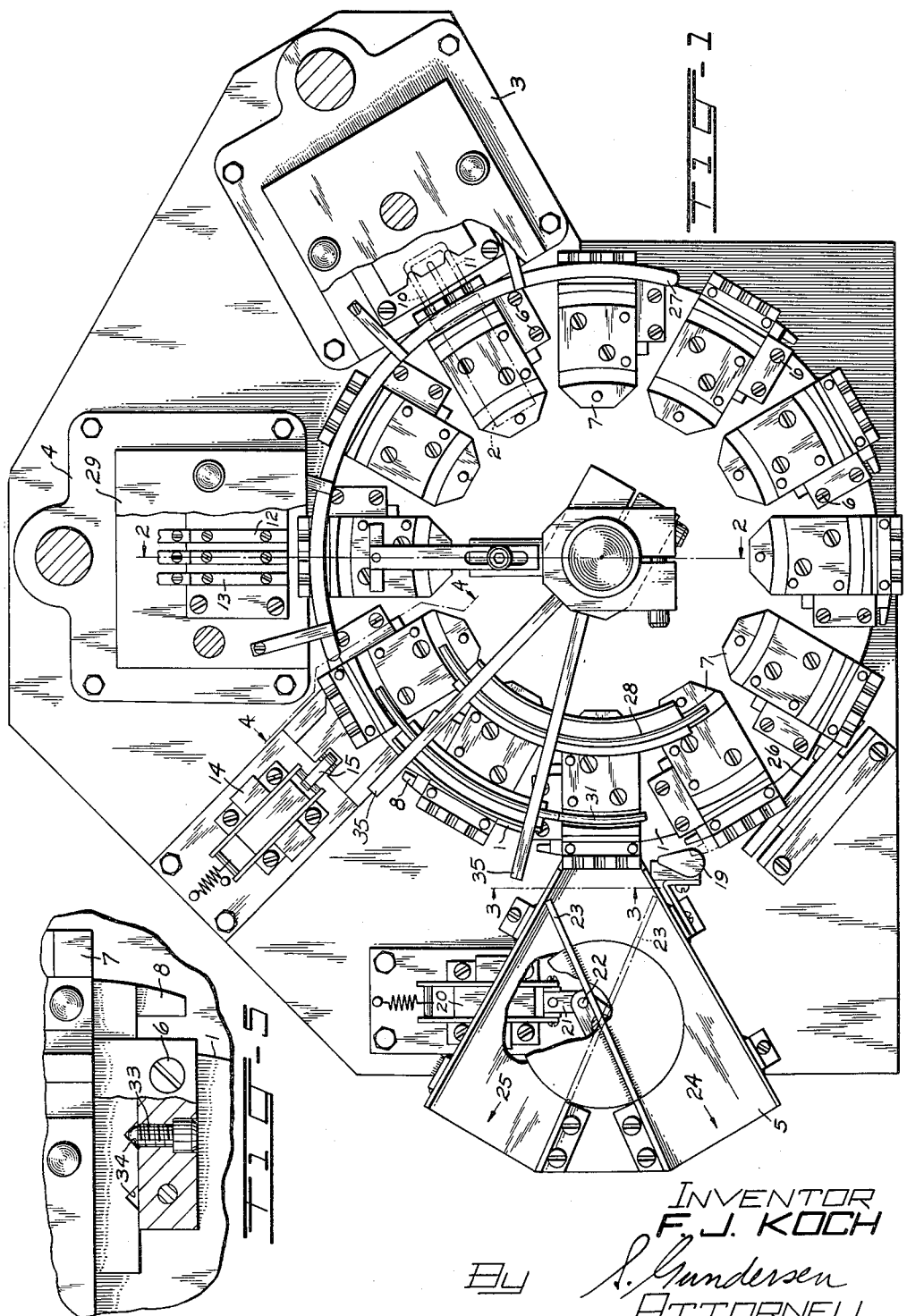
INVENTOR
F. J. KOCH
BY
S. Gundersen
ATTORNEY

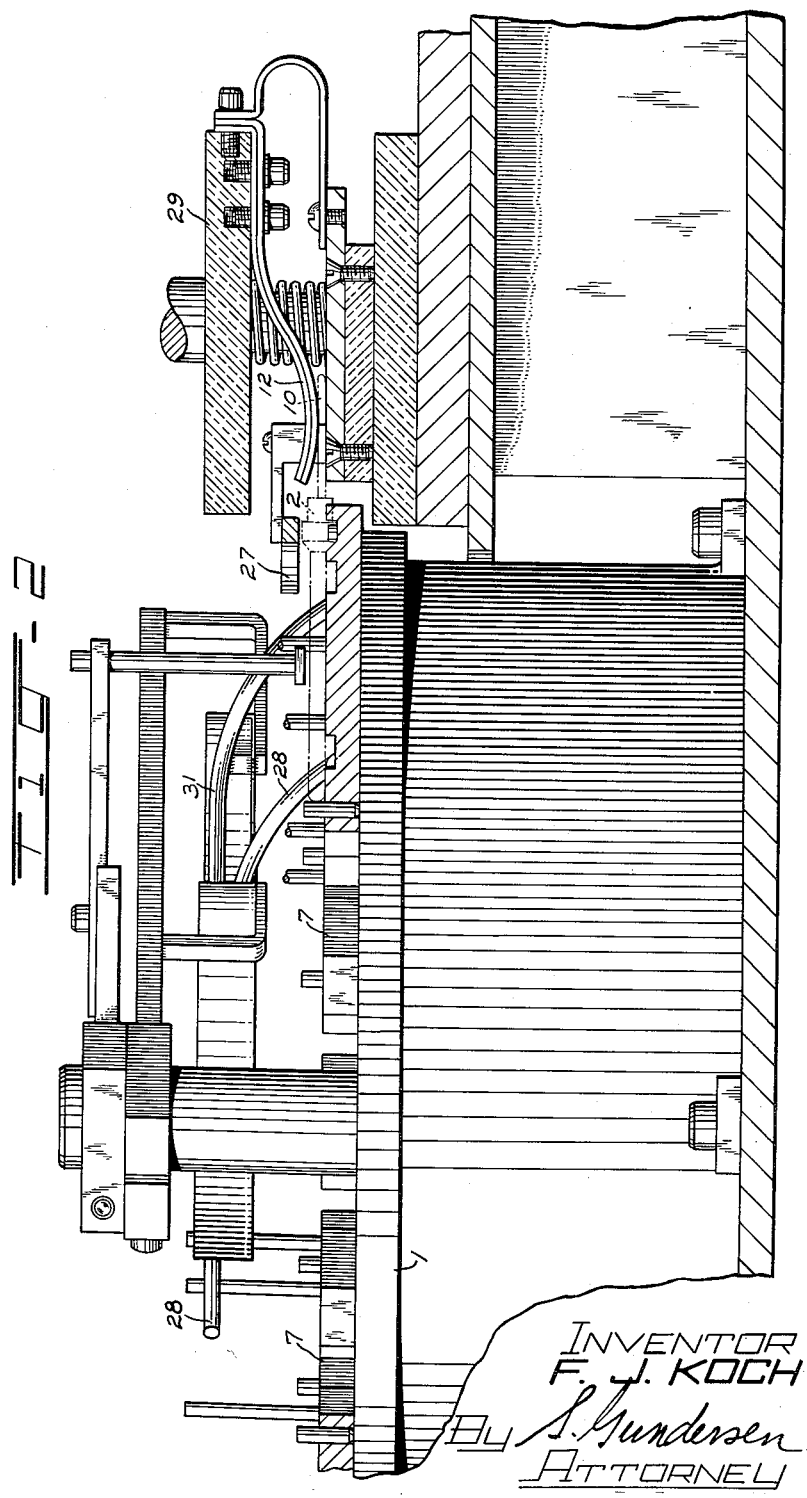

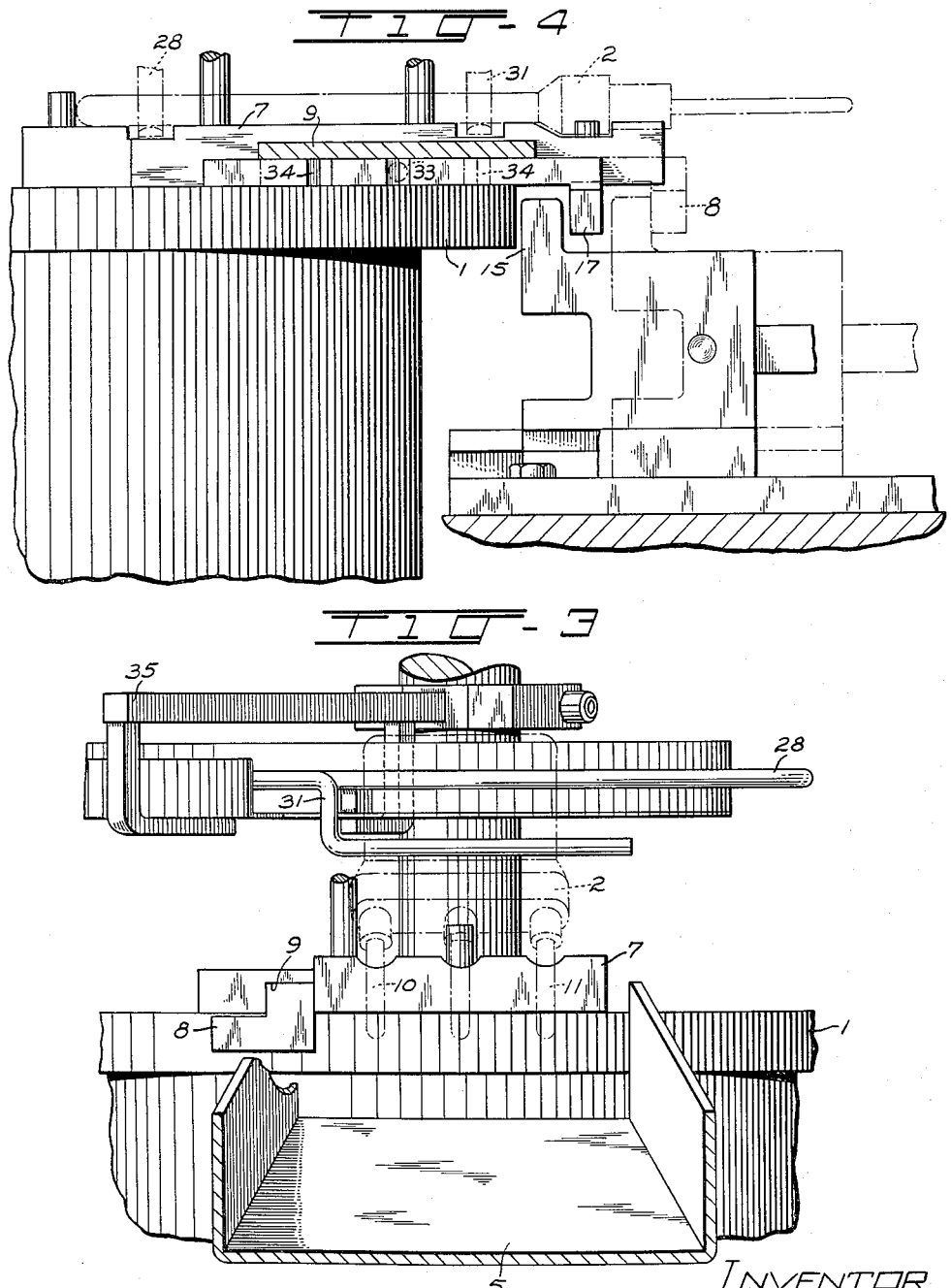

United States Patent Office 3,023,897
Patented Mar. 6, 1962

3,023,897
TESTING AND SORTING APPARATUS
Frank J. Koch, Irvington, N.J., assignor to Western Electric Company, Incorporated, New York, N.Y., a corporation of New York
Filed July 1, 1959, Ser. No. 824,293
3 Claims. (Cl. 209—74)

This invention relates to a testing and sorting device and more particularly to a testing and sorting device which includes a turntable and a selective hopper.

In the manufacture of various articles, for example electrical components, it is often desired to automatically test each article and, subsequently, segregate those articles which have successfully met the test from those which failed. In prior testing devices utilizing a turntable, articles failing one or more tests were segregated by hand or by spring loaded devices. Hand segregation and spring loaded devices are limited in adjustability and rapidity of response.

In the present invention a turntable having affixed thereto a series of article holders revolves about its axis to move articles placed therein into one or more test stations. Should an article fail to pass a test, a lever on the turntable is moved and the lever actuates a deflecting element in a selective hopper so that when the tested article reaches the hopper it will be properly sorted. The rate of operation may be varied by adjusting the turntable speed and the position of the levers relative to the hopper actuating means.

It is an object of the present invention to provide an automatic article testing and selecting mechanism.

It is the further object of the present invention to provide such apparatus which is readily adjustable for various speeds of operation and various sizes of articles.

The invention will be better understood from the following detailed description taken in conjunction with the accompanying drawings in which:

FIG. 1 is a top plan view of the apparatus;
FIG. 2 is a side view of the same apparatus;
FIG. 3 is a partial perspective view of the apparatus from the selective hopper;
FIG. 4 is a side view illustrating the lever and its actuator; and
FIG. 5 is a top plan partially cut-away view illustrating the lever.

With reference now particularly to the drawings, FIG. 1 depicts turntable 1 suitable for transporting a series of articles 2, in this case flat-type resistors, through work station 3, testing station 4 and into position for dropping into selective hopper 5. Turntable 1 may be of any type; however, it has been found that a twelve position counterclockwise indexing turntable driven by a variable speed electric motor is satisfactory. Article holders 7, adapted to conform to the shape of articles 2, are affixed to turntable 1 by bolts 6. Article holders 7 may be readily interchanged with other article holders of different configurations should the articles to be tested be of a different shape. In FIG. 1, twelve article holders 7, gripping articles 2 by raised pins, are mounted on turntable 1.

Mounted on one side of article holders 7 are article holder levers 8 which slide in grooves 9. The sliding motion of article holder levers 8 is radial, inwardly toward the center axis of turntable and outwardly toward its outer circumference. In FIG. 5, lever 8 is held in its extended and unextended positions by spring pressed detents 33 operating in notches 34.

Work station 3 comprises a preliminary test station, a stamping punch, or other type of article working device. It has been found convenient in the manufacture of flat-type resistors that work station 3 be an electric punch device cutting a shorting strip on the resistor leads and operated in time sequence with turntable 1. Testing station 4 likewise consists of a timed electric punch 29. In FIG. 1, leads 10 and 11 of article 2 are held against test station leads 12 and 13 at testing station 4 by an electric punch 29. The testing device (not shown) may be any testing apparatus which sends out an electrical pulse if the article under test does not meet predetermined standards. An example of such a testing device is resistance testing apparatus which sends out a positive electrical pulse if the resistance under test is either too low or too high. The test set is connected by wires to actuator 14. Actuator 14, which may be a solenoid or other electrically operated motor, is mounted adjacent to turntable 1. End hook portion 15 of actuator 14 is normally extended toward the center axis of turntable 1 and is positioned beneath article holder levers 8 and article holders 7. Upon actuation, by a pulse from the test set, actuator 14 pulls hook portion 15 away from the center of turntable 1, hook portion 15 grapples lip 17 of article holder lever 8 and pulls article holder lever 8 away from the center axis of turntable 1.

Article holder lever 8, upon which actuator 14 operates, is associated with the article holder 7 in advance of (taken in the direction of travel of turntable 1) the article holder positioned at testing station 4. Article holder lever 8 of such advance article holder 7 is thereby extended away from the center of turntable 1 if article 2 under test at testing station 4 fails the test.

Upon rotation of turntable 1 article holder lever 8 comes into pressure contact with switch 19. Article levers 8 not extended by actuator 14 ride by switch 19 without pressure contact. Pressure contact upon switch 19 closes a circuit actuating motor 20 mounted underneath selective hopper 5. Actuation of motor 20 causes, through the linkage of motor plunger 21 and hopper pivot 22, hopper arm 23 to move in a clockwise direction. Clockwise motion of hopper arm 23 alters the passage within hopper 5 from direction 24, for acceptable articles, to direction 25, for articles to be rejected. Extended article holder lever 8 upon further rotation of turntables 1 is pushed inwardly toward the center of turntable 1 by cam 26.

In operation, articles 2 are inserted, by hand or automatically into article holders 7. Articles are held in article holders 7 by upper rail 27 which extends part way around the circumference of turntable 1. Articles 2 are transported by turntable 1 to work station 3, to testing station 4, past actuator 14, and are then lifted by lifting rails 28 and 31, which slide under articles 2, so that the articles fall by gravity into hopper 5. The rails 28 and 31 are suitably supported from the members 35. Articles successfully passing the test at testing station 4, so that article holder lever 8 remains in its unextended position, fall in direction 24 within hopper 5. Articles failing to meet the test at test station 4, so that actuator 14 extends article holder lever 8 adjacent the preceding article holder, thereby actuating switch 19 and hopper arm 23, fall in direction 25 within hopper 5.

Although the drawings relates to the testing of flat type resistors, it is understood that the present invention is not limited to the working and testing of that particular article.

Modifications may be made in the invention by those skilled in the art and yet be within its scope.

What is claimed is:
1. A testing and sorting apparatus including a work feeding means, a plurality of article holders affixed to the work feeding means, a testing station adjacent the work feeding means for testing articles fed to the testing station by the work feeding means, one of a series of selectively operable members being mounted on the work feeding means in a position preceding each article holder in the direction of article advancement, an article discharge station adjacent the work feeding means including means for selectively deflecting tested articles into one of a plurality of sorting passages, a single actuator adjacent the work feeding means and intermediate the testing station and the article discharge station for actuating the selectively operable members in response to tests of the article at the testing station, operating means for operating said deflecting means, and means for controlling the operating means and selectively operable by a particular selectively operable member prior to the arrival of the next succeeding article at the discharge station, whereby the tested article is deflected into one of the passages at the discharge station in accordance with the test made of the tested article at the testing station.

2. A testing and sorting apparatus according to claim 1, wherein the work feeding means is a turntable, the selectively operable members are slides which are moved to one of two positions in accordance with the test made on the article at the testing station, in one position the slide engaging the switch and in the other position the slide remaining in a path displaced from the switch.

3. A testing and sorting apparatus according to claim 2, wherein the operating means is a motor, and the means for controlling the operating means is a switch.

References Cited in the file of this patent

UNITED STATES PATENTS

| | | |
|---|---|---|
| 2,623,636 | Pounds | Dec. 30, 1952 |
| 2,714,451 | Gammeter | Aug. 2, 1955 |